No. 697,563. Patented Apr. 15, 1902.
F. P. SUTTON.
THRESHING MACHINE.
(Application filed Sept. 4, 1900.)
(No Model.) 3 Sheets—Sheet 3.
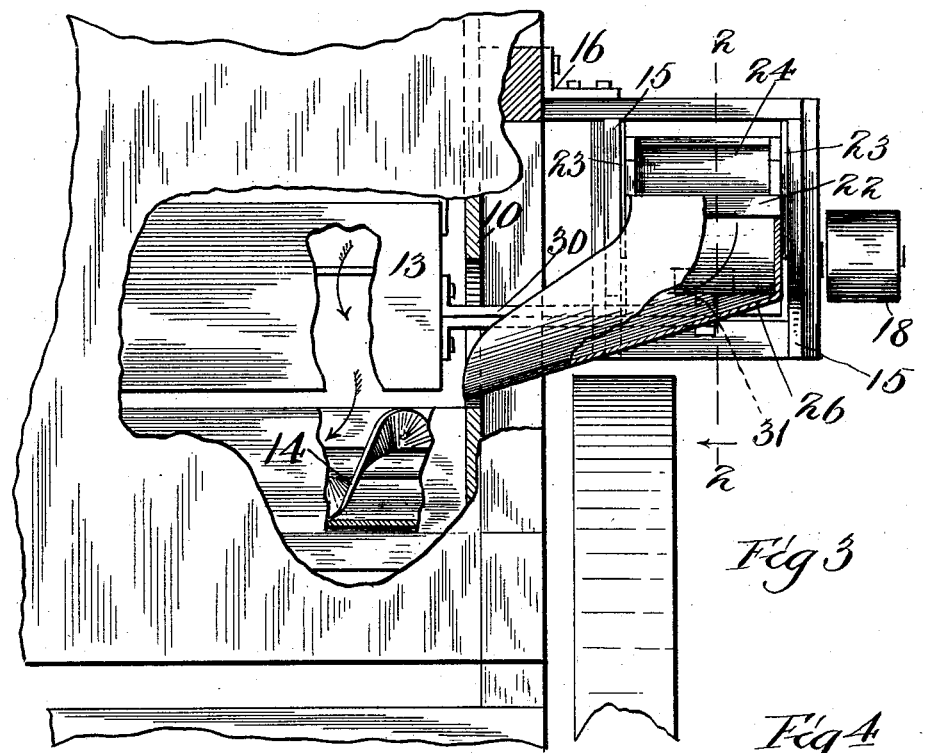
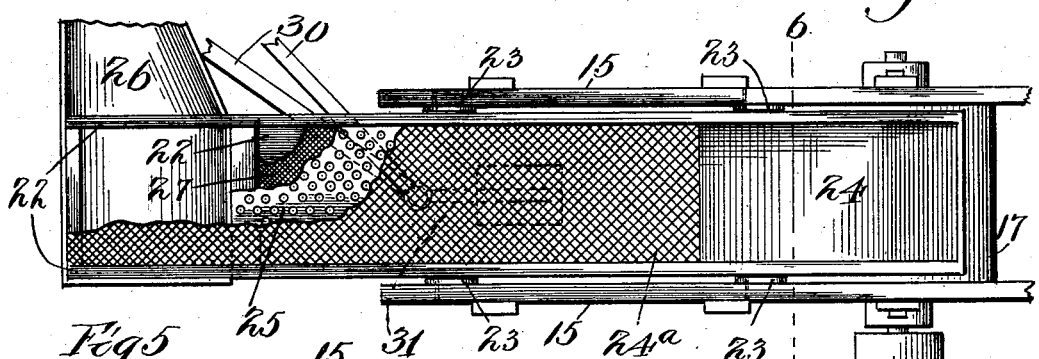
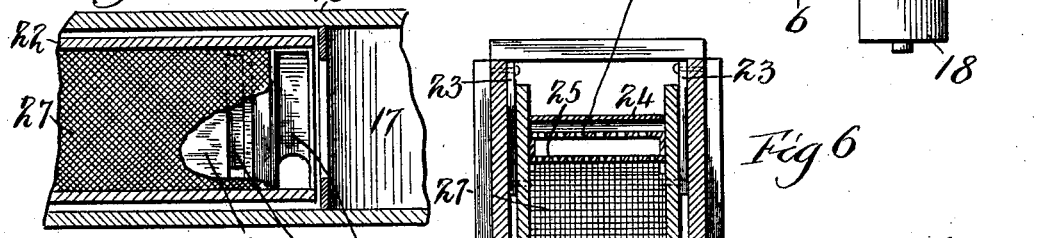
Witnesses
W. C. Corlies
E. M. Klatcher
Inventor
Festus P. Sutton
By Louis K. Gillson Atty

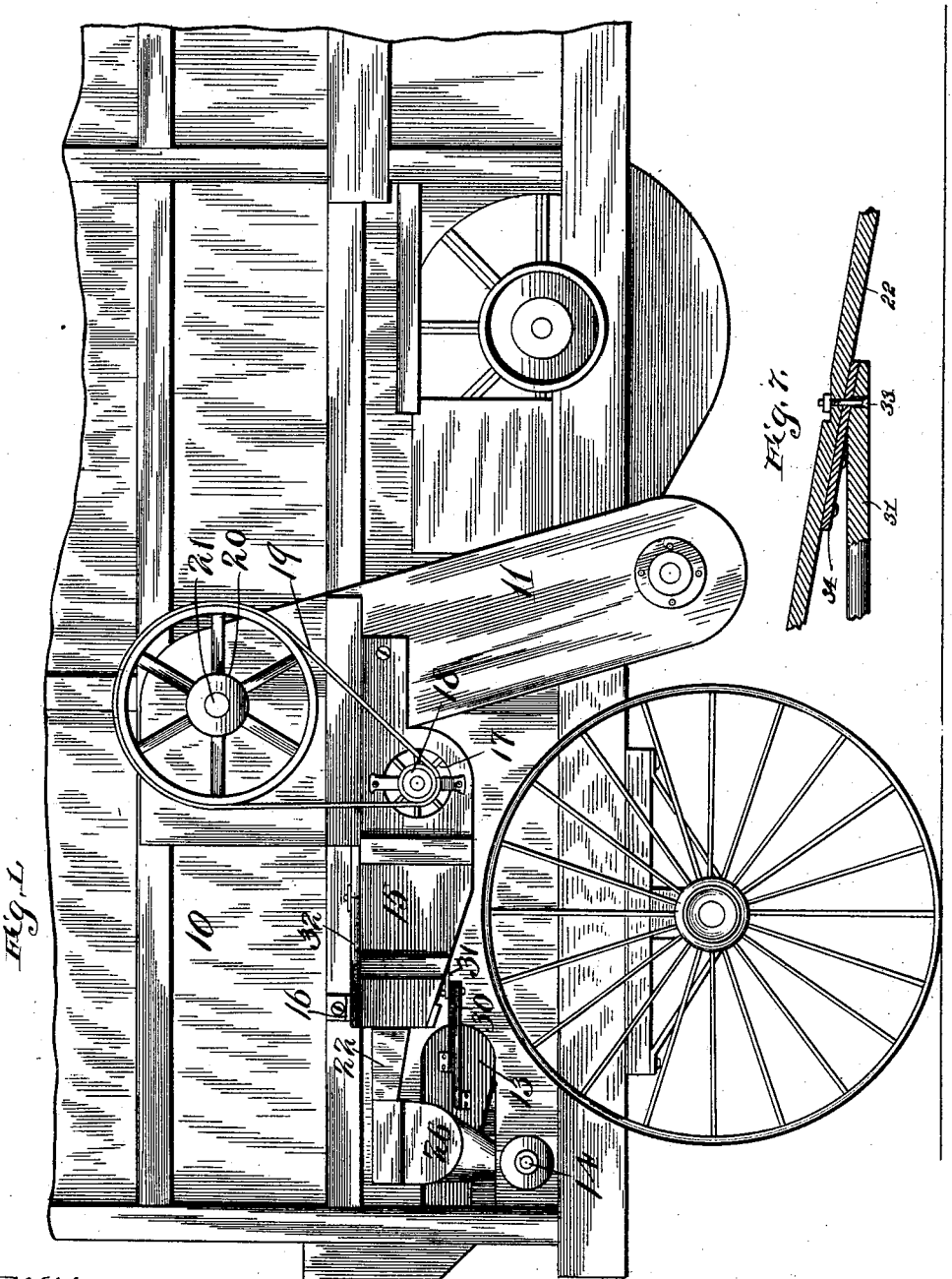

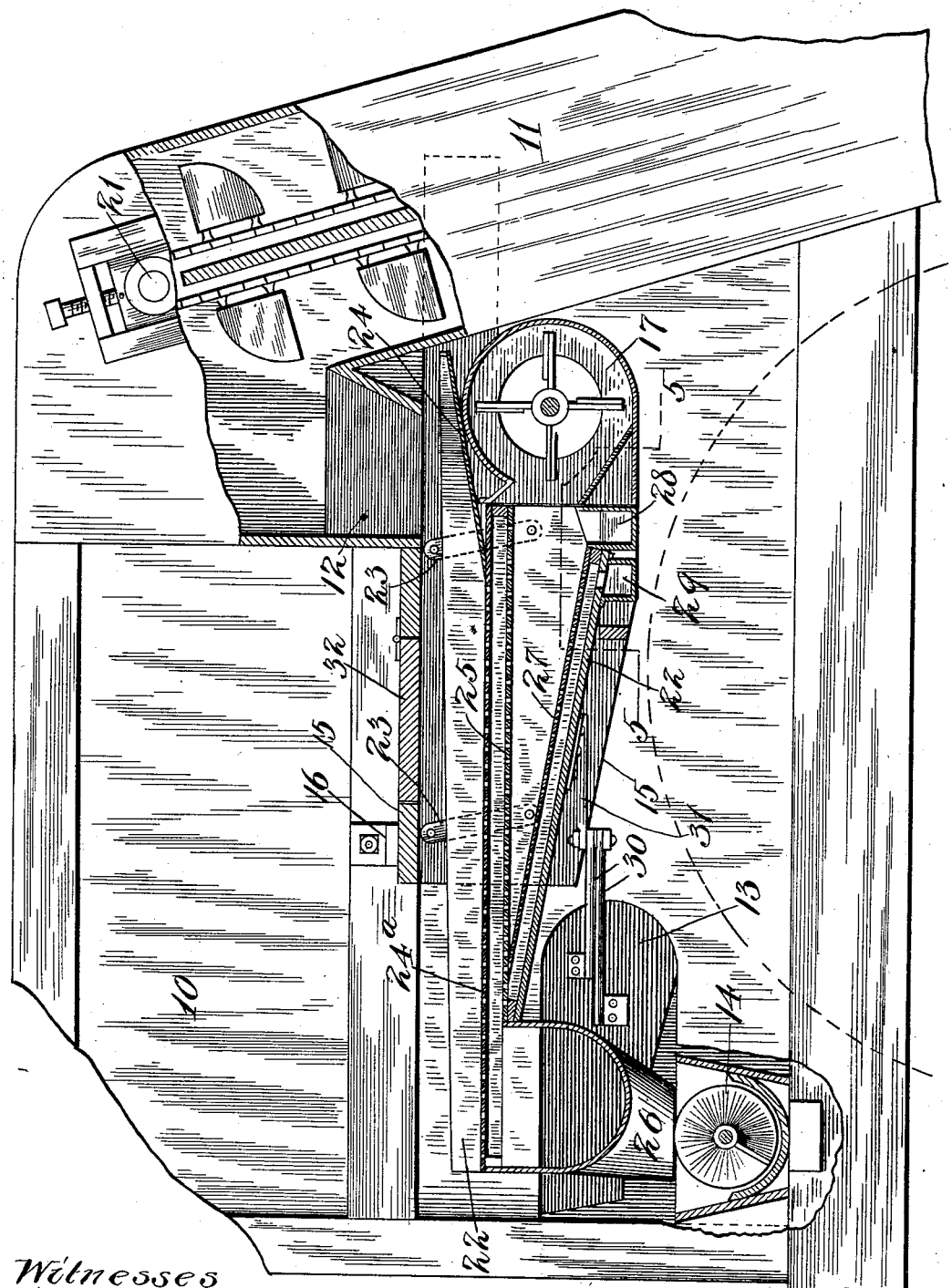

UNITED STATES PATENT OFFICE.

FESTUS P. SUTTON, OF LOWELL, INDIANA.

THRESHING-MACHINE.

SPECIFICATION forming part of Letters Patent No. 697,563, dated April 15, 1902.

Application filed September 4, 1900. Serial No. 28,963. (No model.)

*To all whom it may concern:*

Be it known that I, FESTUS P. SUTTON, a citizen of the United States, and a resident of Lowell, county of Lake, and State of Indiana, have invented certain new and useful Improvements in Threshing-Machines, of which the following is a specification and which are illustrated in the accompanying drawings, forming a part thereof.

This invention relates to that portion of a threshing-machine for wheat, oats, clover, and the like which is known as the "recleaner" and which receives the grain after the winnowing process has been completed by the usual riddles and air-blast and subjects it to a second winnowing process by passing it through a series of riddles acting in conjunction with an air-blast.

The object of the invention is to apply to threshing-machines of ordinary construction, more particularly to those which are provided with what are known as "end-shake" riddles, a recleaning device which receives the grain from the elevator which ordinarily delivers it to the sacks, this recleaner being provided with a series of end-shake riddles which are connected with and actuated from the shoe of the riddles within the threshing-machine.

More specifically, the invention consists of mechanism hereinafter described and which is illustrated in the accompanying drawings, in which—

Figure 1 is a detail side elevation of a threshing-machine with the recleaner attached thereto. Fig. 2 is a similar view, upon a larger scale, of the thresher, some of the parts being broken away and the recleaner being shown in vertical section, taken on the line 2 2 of Fig. 3. Fig. 3 is a detail end elevation of the threshing-machine with some portions broken away and of the recleaner with parts broken away. Fig. 4 is a detail plan view of the recleaner removed from the thresher, some of the parts being broken away. Fig. 5 is a detail plan section on the line 5 5 of Fig. 2, and Fig. 6 is a sectional view on the line 6 6 of Fig. 4. Fig. 7 is a sectional detail.

A portion of the body of a threshing-machine of common form is shown at 10, and at 11 is shown the grain-elevator leading from a grain-conveyer at the bottom of the machine, but not shown in the drawings.

At 12 is shown the delivery-spout of the elevator 11, to which when there is no recleaning of the grain the sacks are applied.

At 13 is shown the riddle-shoe of the threshing-machine and at 14 the tailings-conveyer thereof.

The case of the recleaner is shown at 15 and is, generally speaking, oblong-rectangular in form and is adapted to be secured to the outer face of the side wall of the body of the thresher by means of brackets, one of which is shown at 16. At one end of the case 15 there is located a rotary blower 17, having upon its arbor a pulley 18, over which runs a driving-belt 19, mounted upon a pulley 20, carried by the upper shaft 21 of the elevator 11.

The riddle-shoe of the recleaner is shown at 22 and is hung within the case 15 by means of links 23, so that it reciprocates to and from the mouth of the blower 17. An inclined apron 24, carried by the shoe 22, is located directly below the discharge-mouth 12 of the elevator 11, so as to receive the grain therefrom, and this apron leads to the upper riddle 24ª of the recleaner, which leads to the extreme end of the riddle-shoe 22 and is of sufficiently coarse mesh to permit the grain and any unbroken seed-pods to pass through, while it conveys over and discharges from its ends any straws which may have escaped from the thresher with the grain.

A finer riddle 25 receives the droppings from the riddle 24ª and separates out the grain and sand from the unbroken seed-pods, the latter being discharged over the end of this riddle into a spout 26, which projects through an aperture in the side wall of the body of the thresher 10 and delivers to the tailings-conveyer 14. The grain and sand falling through the riddle 25 are received upon an inclined riddle 27, which is of sufficiently fine mesh to hold the grain which is being treated and deliver it to the grain-spout 28, to which the sacks are applied. Sand falls through the riddle 27 to the floor of the shoe 22, which is inclined and leads to a sand-spout 29.

A rigid bracket 30 is secured to the thresher-shoe 13 and projects through an aperture in the side wall of the thresher, and a link 31 connects this bracket with the recleaner-shoe 22, the connection between the link 31 and the bracket 30 and recleaner-shoe preferably being pivotal, so as to permit the freer movement of the recleaner-shoe should the ways of the shoes 13 and 22 not be strictly parallel. For securing the link 31 to the shoe 22 I employ a bolt 33 and a wear-plate 34, secured to the shoe and against which the link bears. The top of the recleaner-case 15 is shown as provided with an openable door 32, so as to permit access to the interior of the recleaner.

The operation of the device is as follows: The fan of the recleaner-blower receives its motion from the mechanism of the elevator 11, and the riddle-shoe of the recleaner is actuated by and reciprocates with the riddle-shoe of the thresher. The grain in passing through the recleaner is entirely freed from sand and tailings, and the latter are assorted, so as to return the seed-pods which need to be rethreshed to the threshing-machine for further action.

The form of the recleaner and manner of actuating its riddle-shoe not only afford a cheap and convenient construction, but insure the continuous action of the riddle-shoe so long as the shoe of the thresher is in motion, so that in the event of the belt 19 slipping off its pulleys the recleaner will not become choked.

The recleaner is easily and quickly connected to and disconnected from the thresher, so that it may be used or laid aside, as the condition of the grain may require.

It is obvious that the recleaner may be made as a separate article of manufacture and sold for attachment to threshing-machines already in use.

I claim as my invention—

In combination, a threshing-machine having a reciprocating riddle-shoe, a recleaner-case secured to the side of the threshing-machine, a reciprocating riddle-shoe in such case, a bracket secured to the riddle-shoe of the threshing-machine, and a link connecting the bracket with the recleaner riddle-shoe and being pivotally attached to each.

FESTUS P. SUTTON.

Witnesses:
 HERMAN RUGE,
 JOHN BERG.